No. 829,363. PATENTED AUG. 21, 1906.
J. V. BERRY.
NUT LOCK.
APPLICATION FILED MAR. 5, 1906.

WITNESSES:

INVENTOR
JOHN V. BERRY
BY
ATTORNEYS

UNITED STATES PATENT OFFICE.

JOHN V. BERRY, OF SHAMOKIN, PENNSYLVANIA, ASSIGNOR OF ONE-HALF TO CHARLES A. BARRON, OF SHAMOKIN, PENNSYLVANIA.

NUT-LOCK.

No. 829,363.　　　Specification of Letters Patent.　　　Patented Aug. 21, 1906.

Application filed March 5, 1906. Serial No. 304,295.

*To all whom it may concern:*

Be it known that I, JOHN V. BERRY, a citizen of the United States, and a resident of Shamokin, in the county of Northumberland and State of Pennsylvania, have made certain new and useful Improvements in Nut-Locks, of which the following is a specification.

My invention is an improvement in nut-locks, and particularly in locks operating in connection with bolts having right and left threads; and the invention consists in certain novel constructions and combinations of parts hereinafter described and claimed.

Figure 1:
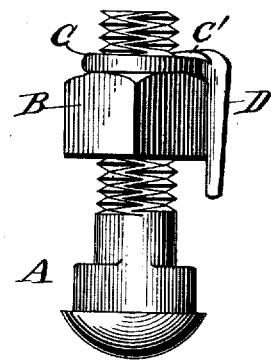
Figure 2:
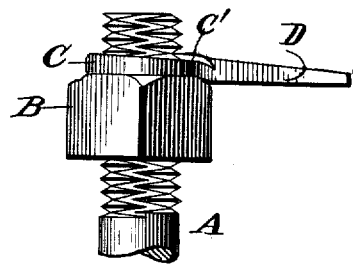
Figure 3:
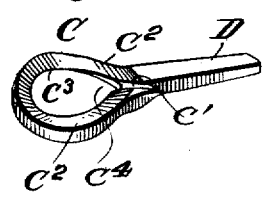
Figure 4:
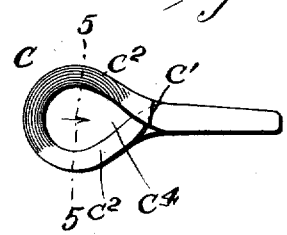
Figure 5:
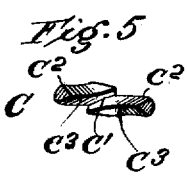

In the drawings, Figure 1 is a side view of a bolt and nut and my improved locking device, the latter being bent down alongside the nut to lock the latter. Fig. 2 is a similar view, partly broken away, showing the locking device screwed down against the nut, but with the handle portion or shank projecting. Fig. 3 is a detail perspective view of the locking device. Fig. 4 is a top plan thereof, and Fig. 5 is a cross-sectional view on about line 5 5 of Fig. 4 looking toward the juncture of the wings with the handle portion or shank.

The bolt A has right and left threads, as shown, and the nut B is screwed on said bolt, preferably on the right-hand threads thereof, as shown. The locking device has a ring or loop C, which merges at C' in the handle or shank D, the wings $C^2$ of the loop diverging from the curved body of the loop toward their juncture with the shank D and overlapping at their ends at C' the body of the loop and its wings $C^2$ being in cross-section about as shown in Fig. 5, with their inner edges at $C^3$ formed to fit the threads of the bolt. It will be noticed that the ends of the wings overlap at C' at their juncture with the shank D and that the locking device is alike on both sides, so that it may be turned on the bolt from either side. It will also be noticed that the open space $C^4$ outside the circle described by the body portion of the loop provides for the separation of the wings $C^2$ in the direction of the axis of the loop to a sufficient extent to permit the spiral in the body of the loop to adapt it to fit the bolt to which it is applied. It will also be understood that if the nut be adapted to the right-hand threads of the bolt the locking device should be adapted to the left-hand threads, and vice versa. After the nut has been turned home and the locking device secured down against the end of the nut the shank or handle D may be bent down alongside the nut, thus locking the same firmly against any movement.

I claim—

1. A nut-locking device comprising a loop and a handle portion or shank leading therefrom, the loop having converging wings connecting with the handle portion or shank, and having said wings deflected at their juncture with the handle portion in the direction of axis of the loop, whereby to form a spiral for screwing on the bolt, the locking device being alike on both sides and the shank or handle being adapted to be bent down alongside the nut for locking the same, substantially as set forth.

2. The combination with a bolt having right and left threads, and a nut fitted to one set of said threads, of a locking device having a loop fitted to the other set of threads, and having said loop provided with converging wings and a handle or a shank connected therewith, the wings of the loop extending tangentially outside of the circle of the body of the loop and deflected outside said circle in the direction of axis of the loop to properly guide into mesh with the threads of a bolt and merging in the handle, substantially as set forth.

JOHN V. BERRY.

Witnesses:
WM. E. RESSLER,
C. J. CROWL.